(12) United States Patent
Shotton et al.

(10) Patent No.: US 8,724,906 B2
(45) Date of Patent: May 13, 2014

(54) COMPUTING POSE AND/OR SHAPE OF MODIFIABLE ENTITIES

(75) Inventors: Jamie Daniel Joseph Shotton, Cambridge (GB); Andrew William Fitzgibbon, Cambridge (GB); Jonathan James Taylor, Cambridge (GB); Matthew Darius Cook, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 228 days.

(21) Appl. No.: 13/300,542

(22) Filed: Nov. 18, 2011

(65) Prior Publication Data

US 2013/0129230 A1    May 23, 2013

(51) Int. Cl.
*G06K 9/68* (2006.01)
*G06K 9/62* (2006.01)

(52) U.S. Cl.
USPC .......................................... 382/218; 382/209

(58) Field of Classification Search
USPC .................. 382/103, 154, 209, 215, 216, 218
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Sminchisescu, et al., "Human Pose Estimation from Silhouettes a Consistent Approach using Distance Level Sets", In Proceedings of WSCG International Conference on Computer Graphics, Visualization and Computer Vision, 2002, pp. 413-420.

(Continued)

*Primary Examiner* — Daniel Mariam
(74) *Attorney, Agent, or Firm* — Pablo Tapia; Jim Ross; Micky Minhas

(57) ABSTRACT

Computing pose and/or shape of a modifiable entity is described. In various embodiments a model of an entity (such as a human hand, a golf player holding a golf club, an animal, a body organ) is fitted to an image depicting an example of the entity in a particular pose and shape. In examples, an optimization process finds values of pose and/or shape parameters that when applied to the model explain the image data well. In examples the optimization process is influenced by correspondences between image elements and model points obtained from a regression engine where the regression engine may be a random decision forest. For example, the random decision forest may take elements of the image and calculate candidate correspondences between those image elements and model points. In examples the model, pose and correspondences may be used for control of various applications including computer games, medical systems, augmented reality.

20 Claims, 11 Drawing Sheets

(56) References Cited

U.S. PATENT DOCUMENTS

| | | |
|---|---|---|
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,926,568 A * | 7/1999 | Chaney et al. ................. 382/217 |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,167,578 B2 | 1/2007 | Blake et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |

(56) References Cited

U.S. PATENT DOCUMENTS

| | | | |
|---|---|---|---|
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 7,925,081 B2 | 4/2011 | Gupta et al. | |
| 7,974,443 B2 | 7/2011 | Kipman et al. | |
| 8,009,880 B2 | 8/2011 | Zhang et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,154,590 B2* | 4/2012 | Kressel et al. | 348/77 |
| 2008/0026838 A1 | 1/2008 | Dunstan et al. | |
| 2010/0111370 A1* | 5/2010 | Black et al. | 382/111 |
| 2011/0267344 A1* | 11/2011 | Germann et al. | 345/420 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Wuhrer, et al., "Human Shape Correspondence with Automatically Predicted Landmarks", In Journal of Machine Vision and Applications, vol. 22, Aug. 6, 2011, pp. 1-10.

Agarwal, et al., "3D Human Pose from Silhouettes by Relevance Vector Regression", In Proceedings of IEEE Computer Society Conference on Computer Vision and Pattern Recognition, vol. 2, Jun. 27-Jul. 2, 2004, pp. 882-888.

Elgammal, et al., "Inferring 3D Body Pose from Silhouettes using Activity Manifold Learning", In Proceedings of IEEE Computer Society Conference on Computer Vision and Pattern Recognition, vol. 2, Jun. 27-Jul. 2, 2004, pp. 681-688.

Ballan and Cortelazzo, "Marker-less motion capture of skinned models in a four camera set-up using optical flow and silhouettes", 3DPVT, Atlanta, GA, USA, 2008.

Lu, et al., "Multi-view human motion capture with an improved deformation skin model", Digital Image Computing: Techniques and Applications 2008, doi: 10.1109/DICTA.2008.14.

Magnenat-Thalmann et al., "Joint-dependent local deformations for hand animation and object grasping", In Proceedings on Graphics interface 1988, pp. 2633, Canadian Information Processing Society.

Kurihara, "Modeling deformable human hands from medical images", Proceedings of the 2004 ACM SIGGRAPH.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24 Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

\* cited by examiner

COMPUTING POSE AND/OR SHAPE OF MODIFIABLE ENTITIES

BACKGROUND

Modifiable entities such as entities with joints or entities which may deform in part or whole are able to exist in many different configurations and shapes. For example, articulated entities such as the human body, animals, jointed robots, plants, or articulated or deformable parts of such entities including human body organs, are able to exist in different shapes and in different poses. For example, a human hand may be outstretched, curled into a fist or held in many other different poses. It may also exist in different shapes according to individual differences between people.

Previous image processing approaches to interpreting modifiable entities such as the human body, animals or part of these have involved estimating the positions or angles between joints given an image or set of images of the entity. A skeletal model of the human body may be computed and tracked using such estimates from sequences of images. There is an ongoing need to improve accuracy and speed of computation especially since real time processing is needed for many practical applications such as robotics, computer gaming, medical image processing, telepresence, healthcare, sports training and others.

The embodiments described below are not limited to implementations which solve any or all of the disadvantages of known systems for interpreting observed data depicting one or more modifiable entities.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Computing pose and/or shape of a modifiable entity is described. In various embodiments a model of an entity (such as a human hand, a golf player holding a golf club, an animal, a body organ) is fitted to an image depicting an example of the entity in a particular pose and shape. In examples, an optimization process finds values of pose and/or shape parameters that when applied to the model explain the image data well. In examples the optimization process is influenced by correspondences between image elements and model points obtained from a regression engine where the regression engine may be a random decision forest. For example, the random decision forest may take elements of the image and calculate candidate correspondences between those image elements and model points. In examples the model, pose and correspondences may be used for control of various applications including computer games, medical systems, augmented reality, robotics and others.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer game system, the system described is provided as an example and not a limitation. As those skilled in the art will appreciate, the present examples are suitable for application in a variety of different types of systems for calculating pose and/or shape and fitting a model to observed data of a modifiable entity. A non-exhaustive list of examples is: medical imaging system; robotic system; satellite imaging system; augmented reality system; telepresence, healthcare, sports training and others.

A modifiable entity may be an articulated entity or a deformable entity or a combination of these. An articulated entity is any entity having joints which connect one or more limbs, parts or other components together so that they may move with respect to one another. An example of a deformable entity is a body organ. The entity may be of any type and may comprise different types of entity connected together such as a human holding a prop (e.g. a golf player holding a golf club).

For many application domains it is useful to represent a modifiable entity by a canonical model (a model representing a class of objects) which is invariant to the pose and/or shape of the entity; that is, one canonical model of a cat for example may be used to represent instances of cats in different poses and/or shapes. For example, a cat sleeping, a cat with a long tail, a cat with a short tail. The examples below describe how, given observed data of a modifiable entity, it is possible to accurately fit that data to a canonical model in practical time scales. In general, sensing and control applications are able to make use of the outputs of the examples described here to improve performance.

Figure 1:
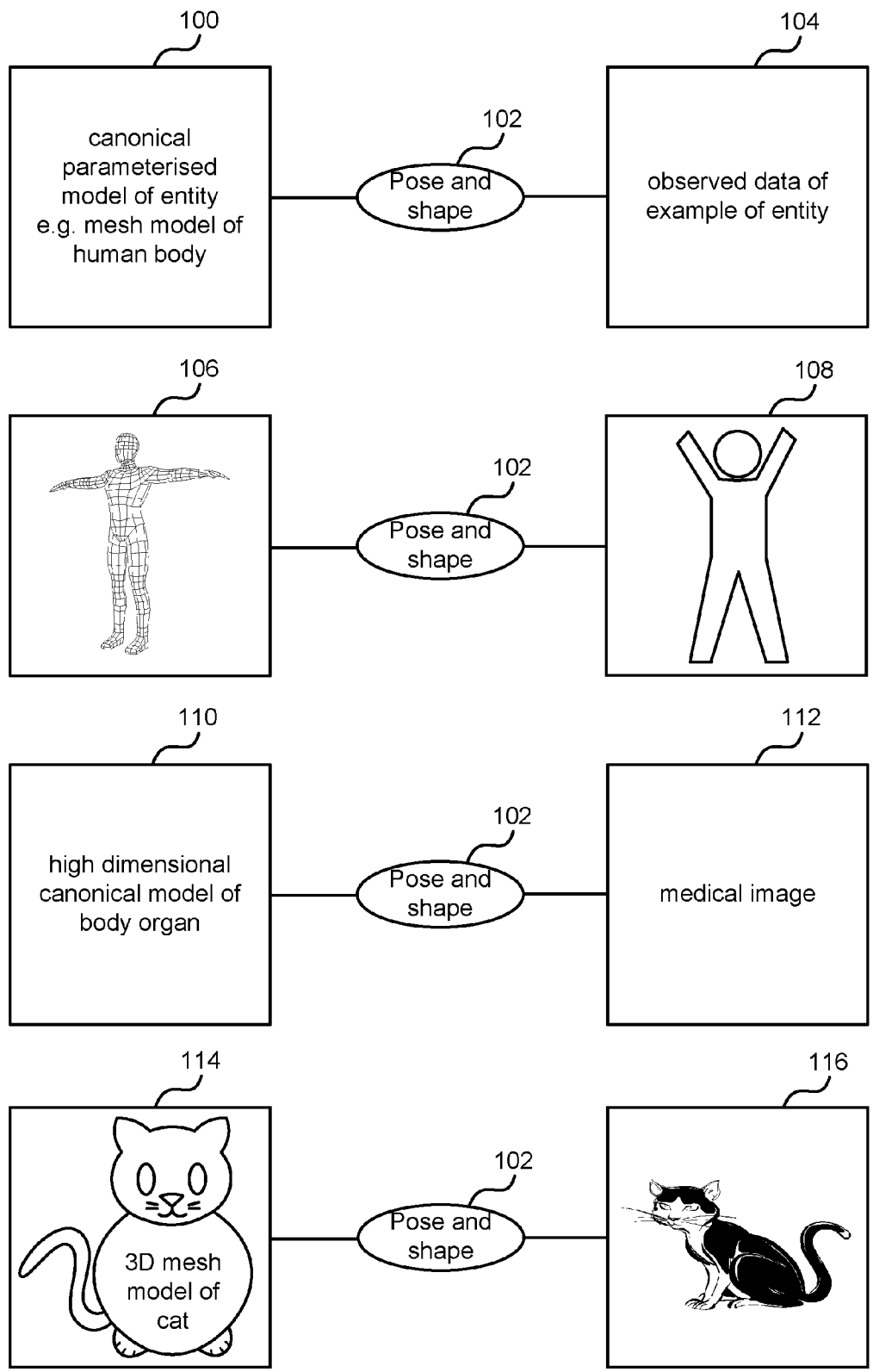
FIG. 1 is a schematic diagram of observed data depicting modifiable entities and corresponding models of the entities.

FIG. 1 is a schematic diagram of observed data depicting modifiable entities and corresponding models of the entities. A canonical parameterized model 100 of a class of modifiable entities is stored in memory. Observed data may be of an entity which is a member of the class. In some examples both shape and pose are directly parameterized in the model. That is, in some examples, a plurality of the parameters of the model specify how the model may potentially be articulated and at least one parameter of the model specifies the shape of the model. In other examples only shape or only pose is directly parameterized in the model. For example, where the model may comprise pose parameters but not shape parameters. In this case, a plurality of models may be used of the entity, each having a different shape (such as several canonical body shapes). A model fitting process as described herein may be carried out for each model to find a good fit. It is also possible to use a plurality of models of the entity each having a different pose but the same shape where the models comprise shape parameters but not pose parameters.

The model may be a two, three or higher dimensional model and it may comprise a manifold comprising a set of points lying on the surface of the manifold. For example, in the case of a human body the manifold may be the surface of the human body. The manifold may be represented as a mesh of triangular or other two dimensional shapes tessellated over a surface. In other examples the model is a volumetric model comprising 3D or higher dimensional points forming a volume of the articulated entity being represented. For example, in the case of a human body organ the model may be a volumetric model. A human body organ is deformable in the sense that its volume deforms according to variations between subjects or over time as an organ undergoes aging, surgery, disease or other changes.

Observed data 104 of an example of the modifiable entity may comprise image data which may be of two, three or higher dimensions. A non-exhaustive list of examples of image data is: medical image, depth image, color image, satellite image, or other type of image. The observed data may be of two, three or higher dimensions. The observed data 104 may comprise single images or sequences of images. In some examples the observed data 104 comprises stereo images from either a stereo camera or from multiple cameras at different view points. In some examples the observed data 104 comprises silhouette images. A silhouette image is a two dimensional binary image identifying foreground and background regions of a depth and/or color RGB image captured by an imaging sensor. In some examples a silhouette depth image may be thought of as a depth image flattened to a fixed depth. It is not essential for the image(s) to be in the form of a regular grid. For example, laser range scanners or rolling shutter cameras may capture image data which is returned as one line scan of an image at a time. In an example the observed data 108 comprises one or more images of at least one person or part of a person. The model comprises a mesh model of a human 106 standing in an upright position with arms outstretched horizontally and legs apart.

By fitting the observed data 104 to the model 100 the pose and/or shape of the model which gives a good match to the observed data is found. The term pose is used to refer to the values of the parameters of the model which specify how the articulated parts of the model are to be oriented with respect to one another in order to described the observed data; as well as to values of one or more parameters which specify the overall orientation of the model (translation, rotation and scale) so that it corresponds to the observed data. The term shape is used to refer to the values of parameters of the model which specify the form and configuration of the model. For example, in the case of a model of a human body the shape parameters may specify the body form of a person (e.g. male/female/child, tall/short).

In the examples described in this document, correspondences between observed data points and model points are also found as part of the model fitting process. A model point is a location in the model. For example, it may be a co-ordinate of a point, patch or region on a manifold such as the surface of a human body. In another example, it may be a coordinate of a voxel or region in a volumetric model. A model point may either be defined in terms of a co-ordinate system of the manifold or model or using an embedding to real world space. The embedding may take into account Euclidean distances or geodesic distances. It is possible to translate or map between co-ordinate systems in any suitable manner. The model fitting output (that is the values of the pose and/or shape parameters and the correspondences) is a very powerful result since the model is a continuous representation of the observed articulated entity and the correspondences give understanding about how the observed data relates to the model. Computer game applications, medical applications, augmented reality applications, robotics applications, human computer interaction and other applications may take the model, pose and correspondence information and use it for control of other processes. In general, sensing and control applications are able to make use of the outputs of the examples described here.

In some embodiments human body pose and/or shape is detected. For example, the model is a mesh model 106 of a human body in a specified pose such as standing upright with arms and legs outstretched horizontally. In some embodiments the mesh model is a triangle mesh model. The observed data 108 may be an image of a person standing with his or her arms stretched upwards for example. The systems described herein find a pose and/or shape of the model which gives a good match to the observed data and correspondences between the data points and points on the model.

In an example, the mesh model of the human body has a structure comprising a plurality of limbs such as: sternum, abdomen, pelvis, left upper arm, left lower arm, left hand, right upper arm, rights lower arm, right hand, left thigh, left calf, left foot, right thigh, right calf, right foot, neck, head. Other numbers and selections of limbs in the model may be used. Each limb is considered as having its own local co-ordinate system which is related to a world coordinate system via a transform which may be represented as a matrix. The transformations for the various limbs may be defined hierarchically according to the arrangement of limbs in the model. For example, the hand transform may be dependent on the lower arm transform, which is in turn dependent on the upper arm transform and so on.

In some examples the observed data comprises at least one medical image 112 and the model comprises a high dimensional canonical model 110 of a body organ. In this case the model may be a volumetric model as mentioned above and the parameters of the model represent the global rotation, translation and scale of the model as well as how components/regions of the volume deform. For example, a tetrahedral mesh model may be used.

In some examples the observed data comprises a color image 116 of a cat and the model comprises a 3D mesh model of a cat 114. The model in this case may have a similar type of structure to the model for the human body but with different numbers of limbs and different hierarchical arrangements of those limbs.

In other examples it is possible for the model to be of one or more sub entities. For example, the model may be of a human holding a prop such as a golf club or a hand holding a dart. The sub entities may be treated as static or articulated or deformable components of the overall model.

Figure 2:
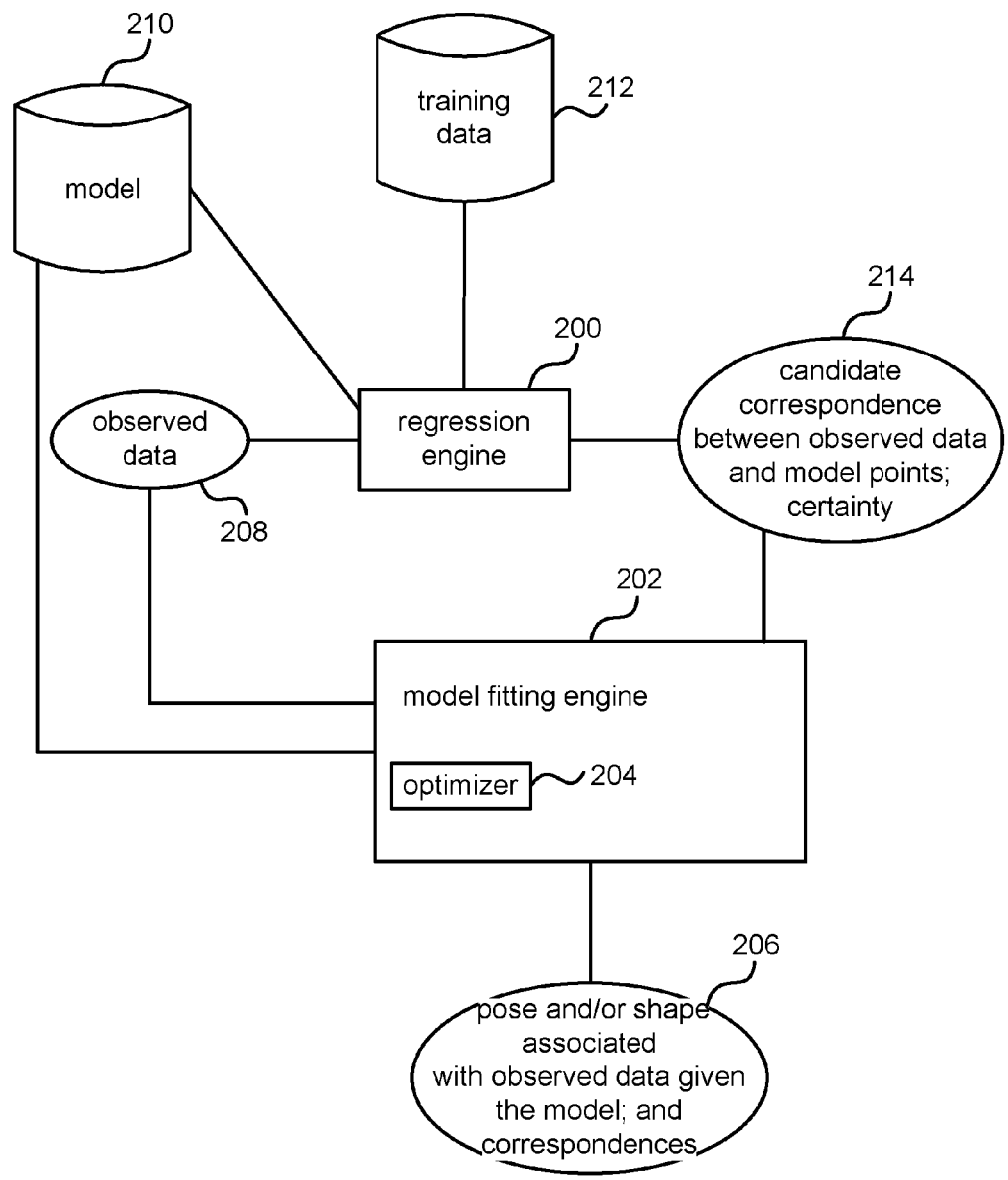
FIG. 2 is a schematic diagram of an apparatus for pose and/or shape calculation and model fitting.

FIG. 2 is a schematic diagram of an apparatus for pose and/or shape calculation and model fitting. A parameterized model 210 of an articulated or deformable entity is stored at a location which is accessible to a regression engine 200 and a model fitting engine 202. The model is of any suitable type as described above with reference to FIG. 1. Observed data 208 is also stored at a location which is accessible to the regression engine 200 and the model fitting engine 202. The observed data 208 may be an image or sequence of images of a modifiable entity to be fitted to the model 210 or any other form of observed data 208 as described above with reference to FIG. 1. The regression engine 200 is trained using training data 212 which is described in more detail below.

Once trained, the regression engine 200 provides functionality to identify or predict candidate correspondences 214 between observed data points and model points. The candidate correspondences 214 may also be referred to as tentative correspondences between data points and model points. The regression engine is also able to provide a measure of the certainty of each of the tentative correspondences. In some examples the regression engine is implemented using a tree-based classifier or regressor such as a random decision forest. A random decision forest comprises one or more decision trees each having a root node, a plurality of split nodes and a plurality of leaf nodes. Observed data such as image elements of an image may be pushed through trees of a random decision forest from the root to a leaf node in a process whereby a decision is made at each split node. Associated with the leaf node that the image element reaches is a probability distribution over candidate model points which may correspond with the observed data of the image element. In other examples the regression engine is implemented using nearest neighbor matching, linear regression, Gaussian processes, support vector regression, relevance vector machines.

The candidate correspondences 214 from the regression engine 200 and the certainty information is accessible to a model fitting engine 202. The model fitting engine 202 also has access to the observed data 208 and the model 210. The model fitting engine 202 is computer-implemented and has access to or stores an objective or energy function 203 over model 210 to observed data 208 agreement. The model fitting engine is arranged to optimize the energy function in order to fit the model to the observed data; that is, to find the values of the pose and/or shape parameters 206 which enable the model to describe the observed data well and to find good correspondences between the observed data points and model points. This may be a very complex process since the number of possible fits between the model and the observed data to be searched is very large. The model fitting engine comprises an optimizer 204 arranged to optimize the energy function in an efficient manner in real time. The model fitting engine 202 makes use of the candidate correspondences 214 and the certainty information to influence the optimization process such that its speed and accuracy is facilitated.

The energy function 203 is a function of the pose parameters and/or shape parameters and the correspondences (the correspondences are the model points which are fitted to the data points). A global optimum of the energy function gives a value of the pose parameters and/or shape parameters and correspondences which explains the observed data 208 given the model 210. In examples the energy function sums up over image elements a robustified distance measure between image elements and model points. The energy function is robustified by adding optional terms as described below. Where the images are depth images the distance measure may be a 3D Euclidean distance measure. Where the images are silhouette images the distance measure may be a 2D re-projection distance measure or point-to-ray distance.

The energy function may comprise a plurality of terms. In an example at least one term is included which depends on both the pose parameters (or shape parameters) and the correspondences (sometimes referred to as the "working" term). The energy function optionally comprises one or more other terms which depend on at least the pose parameters (or shape parameters) or at least on the correspondences. Careful design of the optional terms of the energy function and weights for combining those terms enables the model fitting engine 202 to appropriately deal with situations where local minima in the energy function occur and may result in the optimizer finding a poor solution. For example, where part of the entity is occluded in the observed data 208. Another example may occur where some poses of the entity are excluded because of constraints on the articulation of the entity (for example, elbow angle or other kinematic constraints of the human body). Another example occurs where observed data points are associated with model points which could not be visible given the pose parameters found by the optimizer.

The optimizer 204 is also computer-implemented. In some examples it comprises functionality for finding the minimum of a non-linear function by using an iterative hill-climbing process such as a Newton method which takes into account curvature information. In other examples the optimizer comprises functionality which is an approximation to a Newton method such as the Broyden-Fletcher-Goldfarb-Shannon (BFGS) method. A BFGS method of optimization does not directly calculate the curvature information and uses an approximation to the curvature information obtained from gradient evaluations. The gradient evaluations may be approximate, such as finite difference approximations, or for some examples, derivatives of the energy function are calculated and computed to machine precision. Any type of optimizer 204 may be used for finding the minimum of a non-linear function. For example, one which implements a gradient descent scheme, or a particle swarm optimizer. The optimizer 204 may also comprise functionality for integer optimization. For example, using graph cuts with alpha expansion, loopy belief propagations, tree-reweighted message passing or other integer optimization processes.

The optimizer 204 may be arranged to carry out optimization as an iterative process by first fixing the correspondences using output from the regression engine and optimizing the pose and/or shape parameters whilst the correspondences are fixed. The pose and/or shape parameters may then be fixed and the search for good correspondences between the model and the observed data points continued using another optimization process which may be guided by output from the regression engine. This iterative process is described in more detail below with reference to FIG. 6.

In an example the regression engine 200 comprises a trained random decision forest 304 which has probability distributions over candidate model points associated with its leaves. More detail about this is now given with reference to FIGS. 3 to 5. Observed data such as an image element of an image may be input to the trained random decision forest. The image element is processed through each tree until it reaches a leaf node. Probability information associated with the destination leaf node of each tree is combined and used to give possibly many candidate correspondences between the observed data point (image element) and model points as well as information about the certainty of those candidate correspondences. As mentioned above the model points may be defined either using co-ordinates on the model manifold or using model co-ordinates in an embedding space. The probability information associated with the leaf nodes may be for the model points using either of these co-ordinate systems.

As mentioned above, elements of an image may be pushed through trees of a random decision forest from the root to a leaf node in a process whereby a decision is made at each split node. In an example, the decision is made according to characteristics of the image element and characteristics of other image elements of the same image displaced therefrom by spatial offsets specified by parameters at the split node. At a split node the image element proceeds to the next level of the tree down a branch chosen according to the results of the decision. The random decision forest may use regression or classification as described in more detail below. During training, parameter values (also referred to as features) are learnt for use at the split nodes and data is accumulated at the leaf nodes. For example, candidate correspondences are accumulated at the leaf nodes and stored. As there may be huge numbers of candidate correspondences strategies for reducing the storage may be used. The candidate correspondences may optionally be filtered to remove outliers using a threshold which may be learnt using a validation set of data. The accumulated correspondences may be stored as raw data or a sample of the accumulated correspondences may be stored. A histogram of the accumulated correspondences may be stored or the correspondences may be aggregated by taking a mean, median, mode or other form of aggregation. In some examples a multi-modal distribution is fitted to the accumulated correspondences. This enables application domains involving modifiable entities in which the data is found to be multi-modal to be accommodated well. In an example a mean shift mode detection process is used to cluster the correspondences and a weight is stored for each cluster or mode according to the number of correspondences that reached a particular mode. It is not essential to use a mean shift mode detection process; other clustering processes may be used. Mean shift mode detection is an algorithm that efficiently detects the modes (peaks) in a distribution defined by a kernel density estimator. A kernel density estimator is a non-parametric process for estimating a probability density function, in this case of the accumulated correspondences.

In order to train the random decision forest training data pairs 300 are used where each pair comprises an image of an articulated entity (such as that illustrated schematically in FIG. 4 at 400) and a corresponding image of that entity where the pose and/or shape is known and where each image element has a known assigned model point. The training data may be computer generated from the model and may comprise many examples with different pose and/or shape parameter values.

Figure 3:
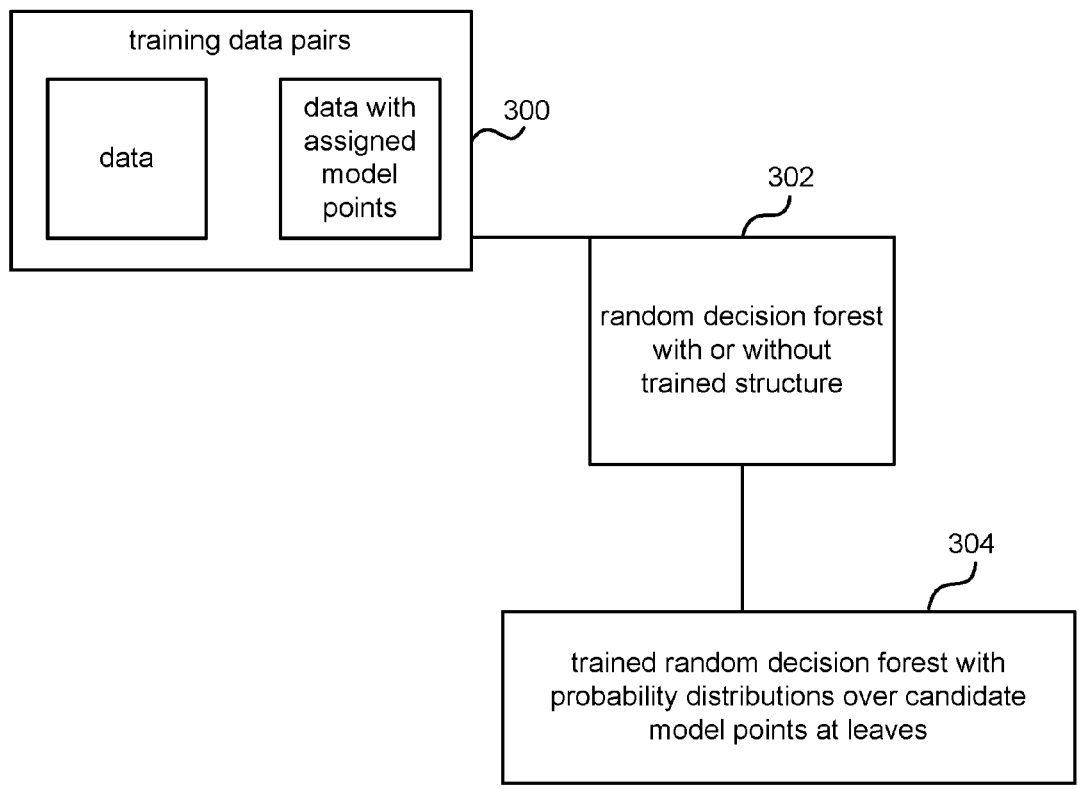
FIG. 3 is a schematic diagram of a system for training a regression engine.
Figure 4:
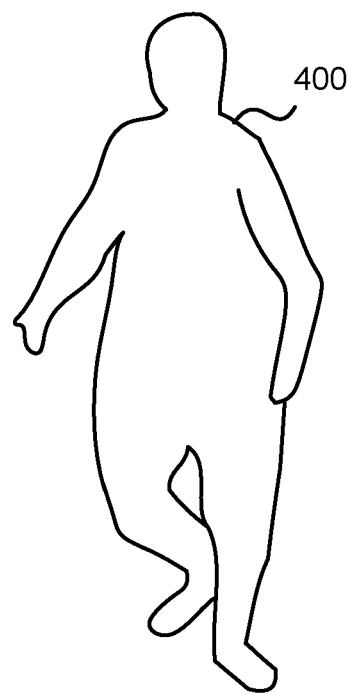
FIG. 4 is a schematic diagram of an image of an articulated entity.

The training data pairs 300 may be used to form the trained structure of the trees in the random decision forest and to learn the parameters for the decisions or tests to be applied at the split nodes. However, this is not essential. A random decision forest that has already been trained on a classification or regression task may be re-used by storing new probability distributions over candidate correspondences at the leaf nodes. This enables the training time and costs to be reduced and potentially also gives improved accuracy. Thus FIG. 3 shows the training data pairs 300 being applied to a random decision forest 302 either with or without a trained structure.

In an example a random decision forest that has already been trained to classify image elements into candidate body parts may be used. The existing data stored in association with the leaf nodes is discarded and replaced by new data. The new data is obtained by pushing the training data through the random decision forest and storing the candidate correspondences which are obtained at the leaf nodes by aggregating those or in any other suitable manner. The result is a trained random decision forest 304 with probability distributions over candidate model points at its leaves. Certainty information for the candidate model points is also available from the probability distributions.

In other examples the structure of the random decision forest is formed as part of the training process and this is described in more detail below with reference to FIG. 7.

Figure 5:
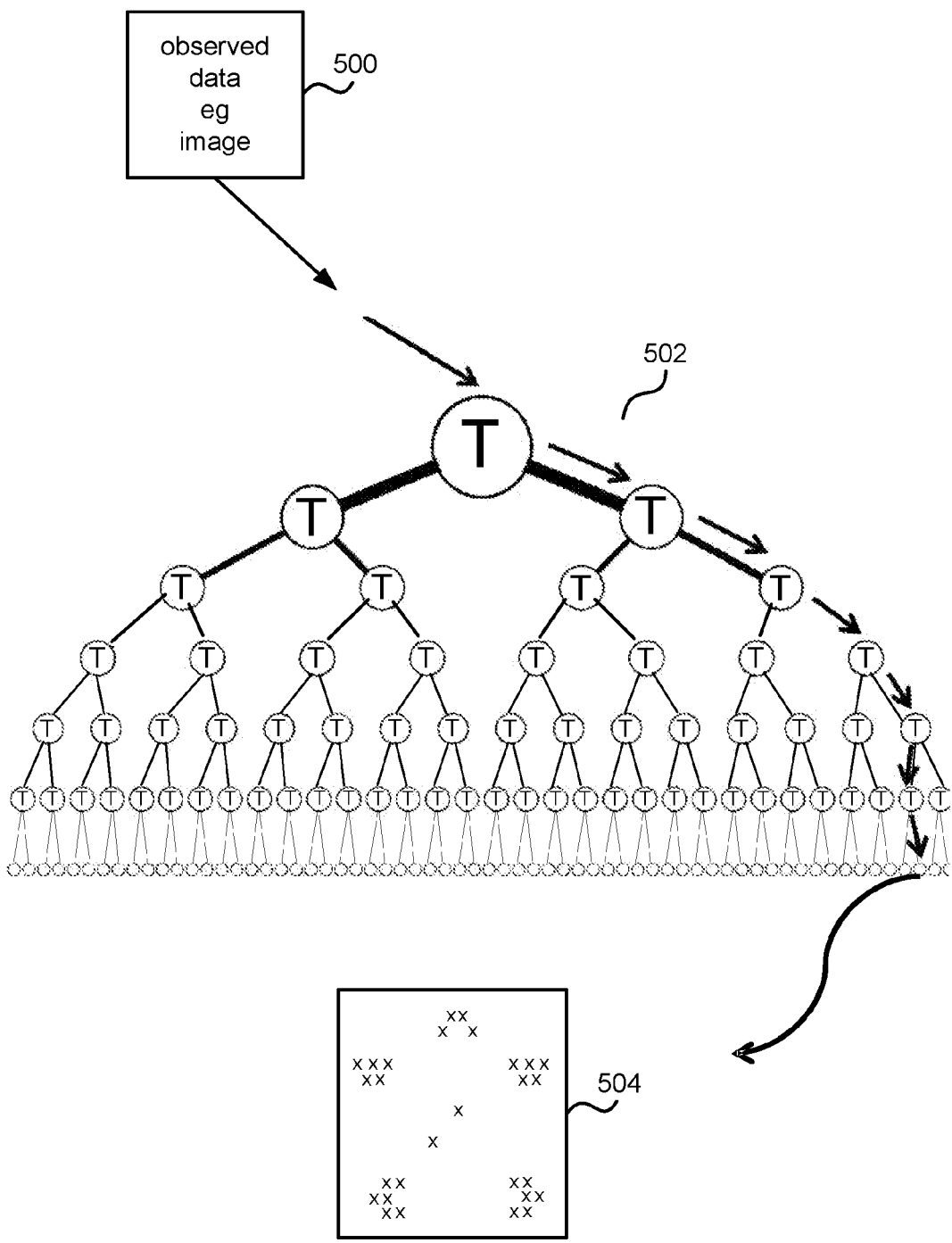
FIG. 5 is a schematic diagram of a tree-based regression engine.

FIG. 5 is a schematic diagram of observed data 500 being applied to a trained random decision forest to obtain candidate correspondences. An image element of an image of a modifiable entity is processed at the root node where a test is carried out represented by T in the diagram. For example, the test compares the image element with another image element of the image (specified by parameters learnt during training or re-used from another trained random decision forest) and according to the result the image element passes to either the left or right child node. This process repeats so that the image element passes down the tree to a leaf node, for example, as illustrated by the arrows in FIG. 5. The leaf node that is reached has an associated probability distribution over candidate correspondences which is represented as 504 in FIG. 5. Candidate correspondences are represented as x's in a region corresponding to the observed data 500. As all the image elements are pushed through the trees in the decision forest correspondences accumulate (note FIG. 5 only shows one image element pushed through one tree). In some examples the candidate correspondences are sorted across all leaves by confidence. In other examples, the candidate correspondences are optionally filtered and then aggregated to form an overall correspondence aggregation for each image element. Any suitable method of aggregating the correspondences at test time may be used. For example aggregation methods similar to those described above for use at training time.

Figure 6:
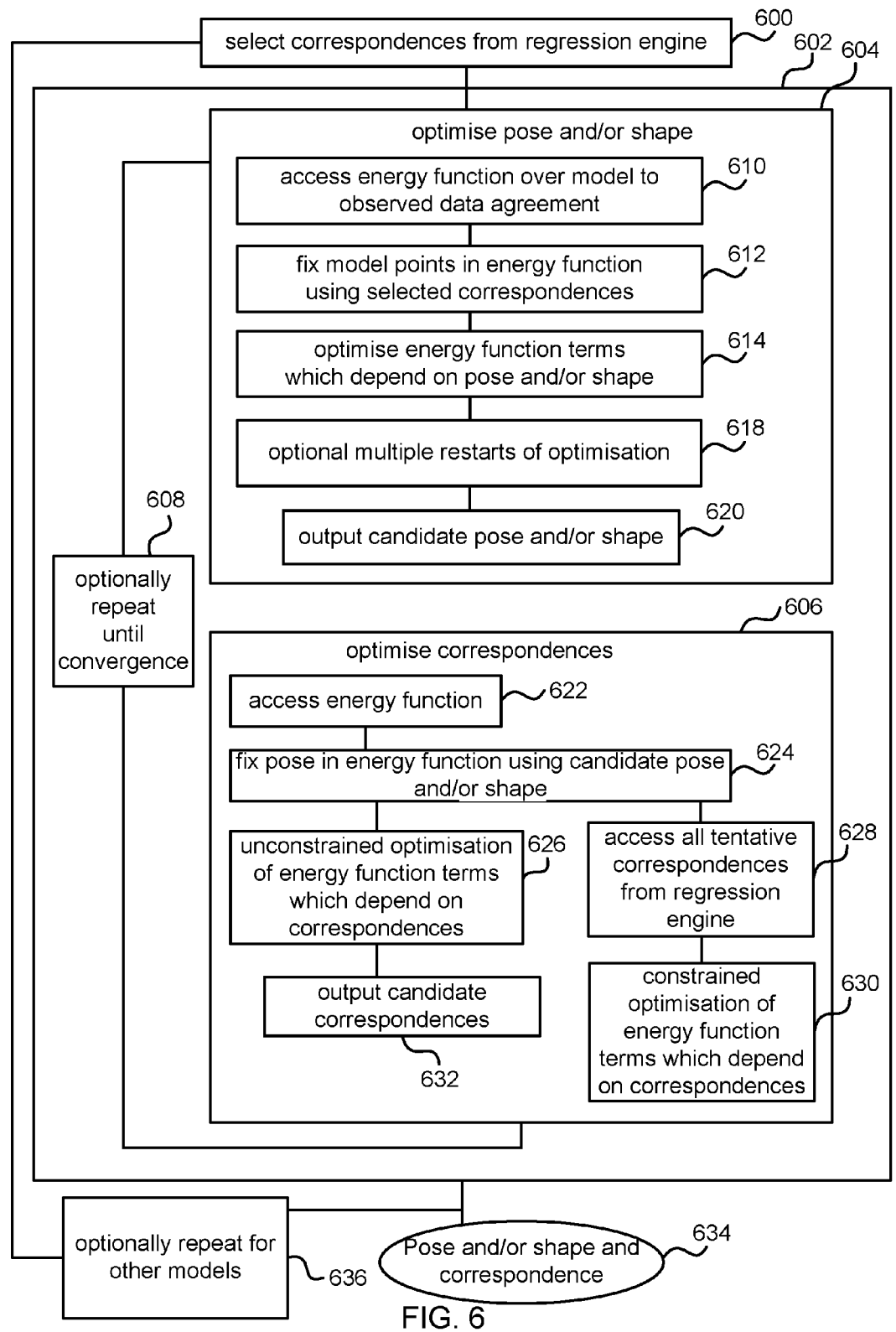
FIG. 6 is a flow diagram of a method at a model fitting engine.

FIG. 6 is a schematic diagram of a method at the model fitting engine 202. Candidate correspondences are selected 600 from the regression engine. Various different criteria may be used to select the candidate correspondences. In an example, for a given image element of the observed data, the candidate correspondences from the leaf node of each tree are sorted by confidence and one or more of the most confident are selected as the candidate correspondence for the image element.

In some cases the candidate correspondences may not lie on the model surface or in the volume of the model. In this case the closest point on or in the model is selected as the candidate correspondence. Any suitable method for bringing the predicted correspondence points onto the surface manifold of the model may be used such as nearest neighbors or other ways of finding a close point on the model. In examples where the regression engine comprises a random decision forest probability distributions for the correspondences may be stored as modes found from a mean shift mode or other clustering process as mentioned above. When the clustering is carried out correspondences having model points at different locations on an articulated entity are aggregated potentially into the same cluster even though some of those model points may be on different limbs. The center of the resulting cluster may be in space around the model rather than in or on the model because of the nature of the clustering process.

Various different starting points for the optimization process may be used. A non-exhaustive list of examples is: random starting point, from a fixed particular pose, by first rotating, translating and scaling a fixed particular pose to fit the candidate correspondences, by using results of a previous frame in examples where a sequence of images of the entity are observed over time.

As mentioned above the optimizer may use an iterative process 602 which comprises optimizing the pose and/or shape 604 whilst the correspondences are fixed in the energy function and then optimizing the correspondences 606 whilst the pose and/or shape is fixed in the energy function. The steps of optimizing the pose and/or shape 604 and optimizing the correspondences 606 may be repeated 608. The output of the process comprises values of the pose parameters and/or shape parameters and final correspondences 634.

The iterative process 602 at the optimizer may itself be repeated 636 for other candidate models (e.g. short man, tall woman, child) in examples where the model is not fully parameterized for shape for example.

The process of optimizing 604 the pose and/or shape parameters comprises accessing 610 an energy function over the model to observed data agreement and fixing 612 model points in that energy function using values of the selected correspondences from the regression engine. The energy function terms which depend on pose and/or shape are optimized 614. In an example a Newton method of optimization or an approximation to a Newton method (a Quasi Newton method) is used for this optimization as mentioned above. Optionally multiple restarts 618 of the optimization are carried out to mitigate against local minima. The result of the optimization is a candidate pose and/or shape 620 comprising numerical values of the pose and/or shape parameters of the model.

The process of optimizing 606 the correspondences comprises accessing 622 the energy function over the model to observed data agreement and fixing 624 pose and/or shape parameters in that energy function using values of the pose and/or shape output by the pose and/or shape optimization process 604. The energy function terms which depend on correspondences are optimized 614, for example, using an integer optimization process of any suitable type.

In some examples the optimization of the energy function terms which depend on correspondences is unconstrained 626 and comprises, for each image element, a search over all model points that have been transformed given the pose and/or shape parameters to find the closest to the image element. This process outputs candidate correspondences 632.

In other examples the optimization of the energy function terms which depend on correspondences is guided by the output of the regression engine. For example, the optimization of the energy function terms which depend on correspondences is fully constrained 630 by the output of the regression engine. For example, all tentative correspondences from the regression engine are accessed 628 and, for each image element, a search is made over those tentative correspondences to find the closest to the image element when the corresponding model point has been transformed given the current pose and shape estimate. In another example, for each image element, the most confident correspondence (or correspondence selected using another specified criterion) from the regression engine is accessed and a search is made of model points near that correspondence to find the closest to the image element.

The assessment of model points near the most confident correspondence may be made by using a distance metric or other measure of similarity.

As mentioned above the energy function comprises a working term which depends on the pose and/or shape parameters and the correspondences. The energy function optionally comprises one or more additional terms each depending on either the pose and/or shape parameters or the correspondences.

In an example the working term of the energy function may be a term which looks for a good pose and/or shape given the model and the data points and which takes into account visibility. For example, data points (which are image elements) ideally do not correspond to model points (transformed by the current pose and shape parameters) which are not visible from a camera or view point from which the image was captured. To take this into account the working term may be set to infinity or another specified value when the model point is not visible from a camera or view point from which the image was captured. The term of the energy function then becomes dependent on the correspondences as well as the pose and/or shape. In order to assess whether a model point is visible from the view point from which the image was captured, surface normals of the model points may be calculated and their direction compared with the direction of the camera's viewing axis. Back-facing surface normals are identified as having a direction generally parallel to the camera's viewing axis. In the case of a depth image the camera's viewing axis is obtained by finding the positive Z axis.

In the examples described herein at least one of the terms of the energy function is designed to take into account similarity between data points and model points. It may be referred to as an appearance term and may depend only on the correspondences. Any one or more measures of similarity may be used such as color, curvature, depth, intensity, or other measures. The appearance term may be arranged for example to have a low value when a model point is a likely correspondent of a given data point in terms of the similarity measure and a high value otherwise. In the examples described herein the regression engine is used to provide the measure of similarity whereby candidate correspondences identified by the regression engine are similar.

In some examples the energy function comprises a term which takes into account prior information about the class of articulated entities being modeled. For example, in the case of the human body the elbow joint has a restricted range of angles through which it may move. This prior term may depend only on the pose and/or shape parameters. Any other kinematic or motion priors may be taken into account using this term. For example where the observed data comprises sequences of images of the entity moving or deforming over time then a motion model may be imposed using the prior term. The motion model may be specified according to knowledge of the way the entity typically moves or deforms over time. For example, by modeling joint angle velocities as constants or by modeling joint angle accelerations.

In some examples the energy function comprises a term which takes into account coherence between neighboring image points and neighboring model points and depends only on the correspondences. For example, a coherence term may encourage nearby image points to map to nearby model points. Other image based weighting terms may be incorporated into the coherence term.

The coherence term enables the model fitting engine to take into account the fact that the correspondences inferred by the regression engine are noisy and have uncertainty. In the constrained and guided correspondence optimization process described above with respect to FIG. 6 the coherence term may be used to take the uncertainty into account by defining a Markov Random Field and solving that with graph cuts, loopy belief propagation or other methods. The coherence term encourages image points which are close to one another to map to model points which are also close to one another. Any suitable metric for measuring how "close" the model or image points are may be used. For example, a geodesic distance, a Euclidean distance in an embedding space.

The terms of the energy function may be combined using a weighted sum or other aggregation. The weights may be learnt using validation data. The weights of the appearance and the working terms may sum to 1 and may be adjusted during the iterative optimization process (although summing to 1). For example, the weight of the visibility term may be set to zero in the first iteration of the optimization and increased as the optimization approaches convergence. Adjusting the weights in this way enables the optimization process to proceed efficiently and to give accurate results.

In examples where the observed data comprises sequences of images of an entity over time the model fitting engine may be arranged to find temporally static shape parameters such as player height or other player shape parameters. The values of these static parameters may then be fixed throughout the optimization process.

In examples where the observed data comprises sequences of images of an entity over time the model fitting engine may be arranged to optimize over the pose and shape over any subset of the sequence such as the whole sequence of the last K frames.

In examples where the observed data comprises multiple images of the entity taken at the same time point from different views, multiple sets of candidate correspondences may be obtained (one from each of the different views). These multiple sets of candidate correspondences may be used by the optimization process.

Figure 7:
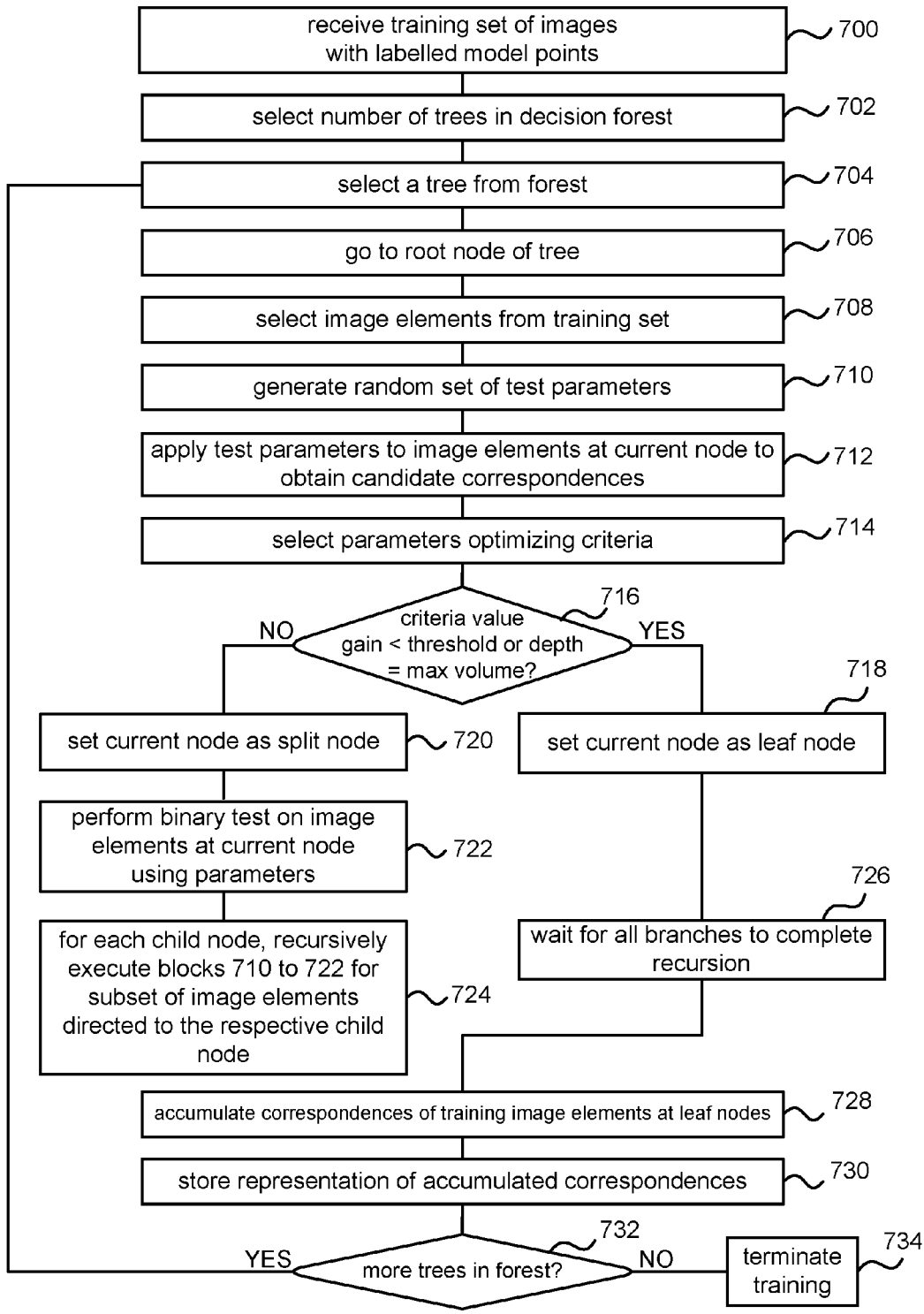
FIG. 7 is a flow diagram of a method of training a tree-based regression engine.

FIG. 7 is a flow diagram of a method of training a random decision forest for use as the regression engine 200 of FIG. 2. The training set described above is first received 700. The number of decision trees to be used in a random decision forest is selected 702. A random decision forest is a collection of deterministic decision trees. Decision trees may be used in classification or regression algorithms, but may suffer from over-fitting, i.e. poor generalization. However, an ensemble of many randomly trained decision trees (a random forest) yields improved generalization. During the training process, the number of trees is fixed.

The following notation is used to describe the training process. An image element in a image I is defined by its coordinates x=(x, y).

The manner in which the parameters used by each of the split nodes are chosen and how the leaf node probabilities may be computed is now described. A decision tree from the decision forest is selected 704 and the root node is selected 706. At least a subset of the image elements from each of the training images are then selected 708. For example, the image may be segmented so that image elements in foreground regions are selected.

A random set of test parameters are then generated 710 for use by the binary test performed at the root node as candidate features. In one example, the binary test is of the form: $\xi > f(x;\theta) > \tau$, such that $f(x;\theta)$ is a function applied to image element x with parameters $\theta$, and with the output of the function compared to threshold values $\xi$ and $\tau$. If the result of $f(x;\theta)$ is in the range between $\xi$ and $\tau$ then the result of the binary test is true. Otherwise, the result of the binary test is false. In other examples, only one of the threshold values $\xi$ and $\tau$ may be used, such that the result of the binary test is true if the result of $f(x;\theta)$ is greater than (or alternatively less than) a threshold value. In the example described here, the parameter $\theta$ defines a feature of the image.

A candidate function $f(x;\theta)$ may only make use of image information which is available at test time. The parameter $\theta$ for the function $f(x;\theta)$ is randomly generated during training. The process for generating the parameter $\theta$ may comprise generating random spatial offset values in the form of a two or three dimensional displacement. The result of the function $f(x;\theta)$ is then computed by observing the depth value (or intensity or other value of the observed data) for a test image element which is displaced from the image element of interest x in the image by the spatial offset. The spatial offsets are optionally made depth invariant by scaling by 1/depth of the image element of interest.

The result of the binary test performed at a root node or split node determines which child node an image element is passed to. For example, if the result of the binary test is true, the image element is passed to a first child node, whereas if the result is false, the image element is passed to a second child node.

The random set of test parameters generated comprise a plurality of random values for the function parameter $\theta$ and the threshold values $\xi$ and $\tau$. In order to inject randomness into the decision trees, the function parameters $\theta$ of each split node are optimized only over a randomly sampled subset $\Theta$ of all possible parameters. This is an effective and simple way of injecting randomness into the trees, and increases generalization.

Then, every combination of test parameter may be applied 712 to each image element in the set of training images. In other words, available values for $\theta$ (i.e. $_i\Theta$) are tried one after the other, in combination with available values of $\xi$ and $\tau$ for each image element in each training image. For each combination, criteria (also referred to as objectives) are calculated. Note that these objectives are different from the energy function or objective function used for pose and/or shape estimation as described above. In an example, the calculated criteria comprise the information gain (also known as the relative entropy). The combination of parameters that optimize the criteria (such as maximizing the information gain (denoted $\theta^*$, $\xi^*$ and $\tau^*$)) is selected 714 and stored at the current node for future use. As an alternative to information gain, other criteria may be used, such as Gini entropy, or the 'two-ing' criterion or others. In an example the objective comprises differential entropy which selects parameters which reduce the variance of correspondences (model points predicted to map to the observed image elements) for subsets of the image elements at a split node.

It is then determined 716 whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set 718 as a leaf node. Similarly, the current depth of the tree is determined (i.e. how many levels of nodes are between the root node and the current node). If this is greater than a predefined maximum value, then the current node is set 718 as a leaf node. Each leaf node has candidate correspondences which accumulate at that leaf node during the training process as described below.

It is also possible to use another stopping criterion in combination with those already mentioned. For example, to assess the number of example image elements that reach the leaf If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set 720 as a split node. As the current node is a split node, it has child nodes, and the process then moves to training these child nodes. Each child node is trained using a subset of the training image elements at the current node. The subset of image elements sent to a child node is determined using the parameters that optimized the criteria. These parameters are used in the binary test, and the binary test performed 722 on all image elements at the current node. The image elements that pass the binary test form a first subset sent to a first child node, and the image elements that fail the binary test form a second subset sent to a second child node.

For each of the child nodes, the process as outlined in blocks 710 to 722 of FIG. 7 are recursively executed 724 for the subset of image elements directed to the respective child node. In other words, for each child node, new random test parameters are generated 710, applied 712 to the respective subset of image elements, parameters optimizing the criteria selected 714, and the type of node (split or leaf) determined 716. If it is a leaf node, then the current branch of recursion ceases. If it is a split node, binary tests are performed 722 to determine further subsets of image elements and another branch of recursion starts. Therefore, this process recursively moves through the tree, training each node until leaf nodes are reached at each branch. As leaf nodes are reached, the process waits 726 until the nodes in all branches have been trained. Note that, in other examples, the same functionality may be attained using alternative techniques to recursion.

Once all the nodes in the tree have been trained to determine the parameters for the binary test optimizing the criteria at each split node, and leaf nodes have been selected to terminate each branch, then candidate correspondences may be accumulated 728 at the leaf nodes of the tree. This is the training stage and so particular image elements which reach a given leaf node have specified correspondences known from the ground truth training data. A representation of the accumulated correspondences may be stored 730 using various different methods as described above.

Once the accumulated correspondences have been stored it is determined 732 whether more trees are present in the decision forest. If so, then the next tree in the decision forest is selected, and the process repeats. If all the trees in the forest have been trained, and no others remain, then the training process is complete and the process terminates 734.

Therefore, as a result of the training process, one or more decision trees are trained using synthesized or empirical training images. Each tree comprises a plurality of split nodes storing optimized test parameters, and leaf nodes storing associated candidate correspondences or representations of aggregated candidate correspondences. Due to the random generation of parameters from a limited subset used at each node, the trees of the forest are distinct (i.e. different) from each other.

The training process may be performed in advance of using the regression engine. The decision forest and the optimized test parameters may be stored on a storage device for use in model fitting at a later time.

Figure 8:
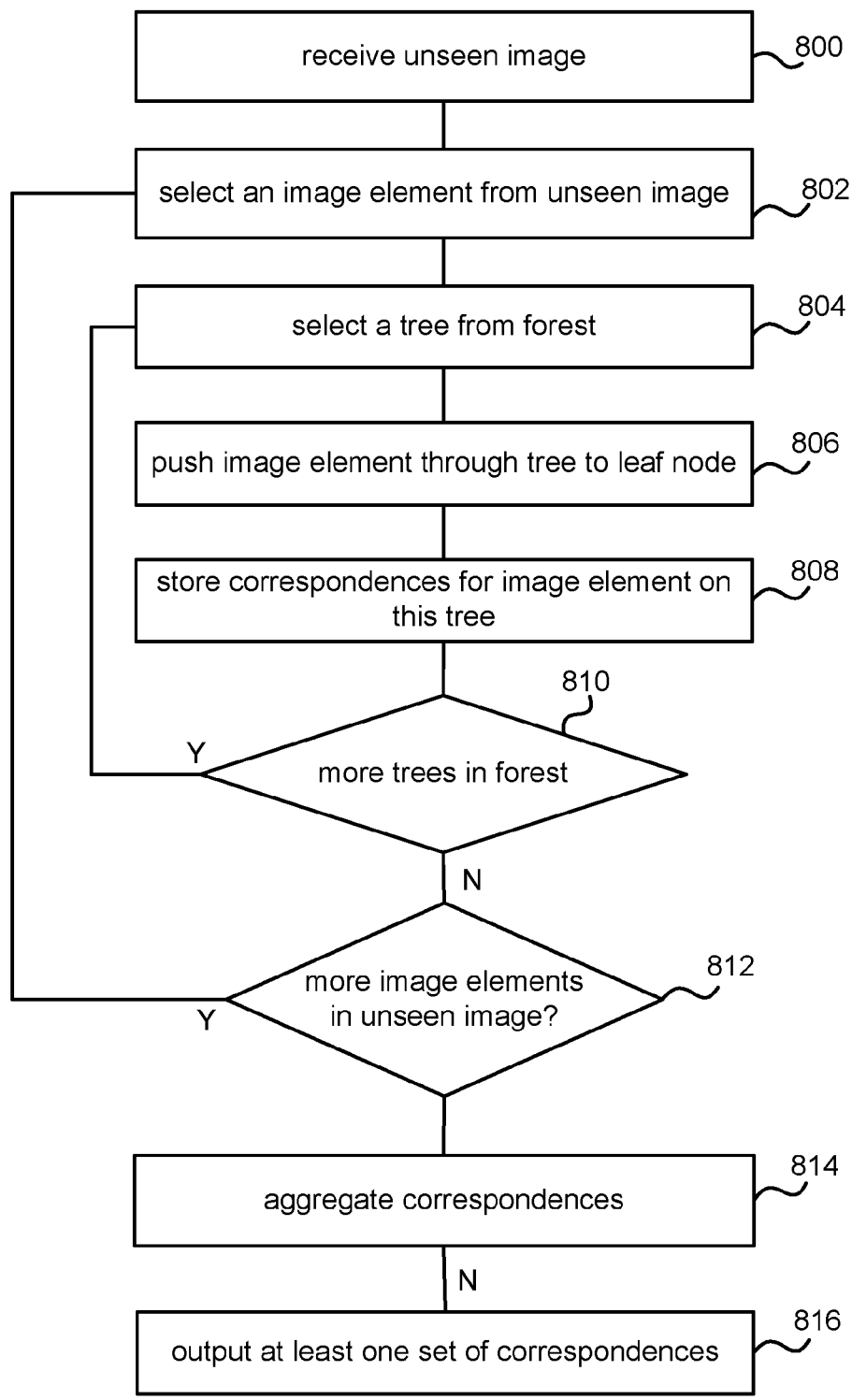
FIG. 8 is a flow diagram of a method of using a trained tree-based regression engine to obtain tentative correspondences between observed data and model points.

FIG. 8 illustrates a flowchart of a process for predicting correspondences (model points which correspond with image elements) in a previously unseen image using a decision forest that has been trained as described hereinabove. Firstly, an unseen depth image is received 800. An image is referred to as 'unseen' to distinguish it from a training image which has the correspondences already specified. Note that the unseen image may be pre-processed to an extent, for example to identify foreground regions, which reduces the number of image elements to be processed by the decision forest. However, pre-processing to identify foreground regions is not essential.

An image element from the unseen image is selected 802. A trained decision tree from the decision forest is also selected 804. The selected image element is pushed 806 through the selected decision tree (in a manner similar to that described above with reference to FIG. 5), such that it is tested against the trained parameters at a node, and then passed to the appropriate child in dependence on the outcome of the test, and the process repeated until the image element reaches a leaf node. Once the image element reaches a leaf node, the accumulated correspondences (from the training stage) associated with this leaf node are stored 808 for this image element.

If it is determined 810 that there are more decision trees in the forest, then a new decision tree is selected 804, the image element pushed 806 through the tree and the accumulated correspondences stored 808. This is repeated until it has been performed for all the decision trees in the forest. Note that the process for pushing an image element through the plurality of trees in the decision forest may also be performed in parallel, instead of in sequence as shown in FIG. 8.

It is then determined 812 whether further unanalyzed image elements are present in the unseen depth image, and if so another image element is selected and the process repeated. Once all the image elements in the unseen image have been analyzed, then correspondences are obtained for all image elements.

As the image elements are pushed through the trees in the decision forest, correspondences accumulate. These accumulated correspondences are aggregated 814 to form an overall correspondence aggregation for each image element. Methods of aggregating the correspondences at test time mentioned above with reference to FIG. 5. Optionally a sample of correspondences may be taken for aggregation. For example, N correspondences may be chosen at random, or by taking the top N weighted correspondences, and then the aggregation process applied only to those N correspondences. This enables accuracy to be traded off against speed.

At least one set of correspondences may then be output 816 where the correspondences may be confidence weighted. More than one set of correspondences may be output; for example, where there is uncertainty. Also, a set of correspondences may comprise nulls for one or more observed data points.

In some examples the regression engine 200 and the model fitting engine 202 described above are incorporated in a system for controlling a computer game as now described.

Figure 9:
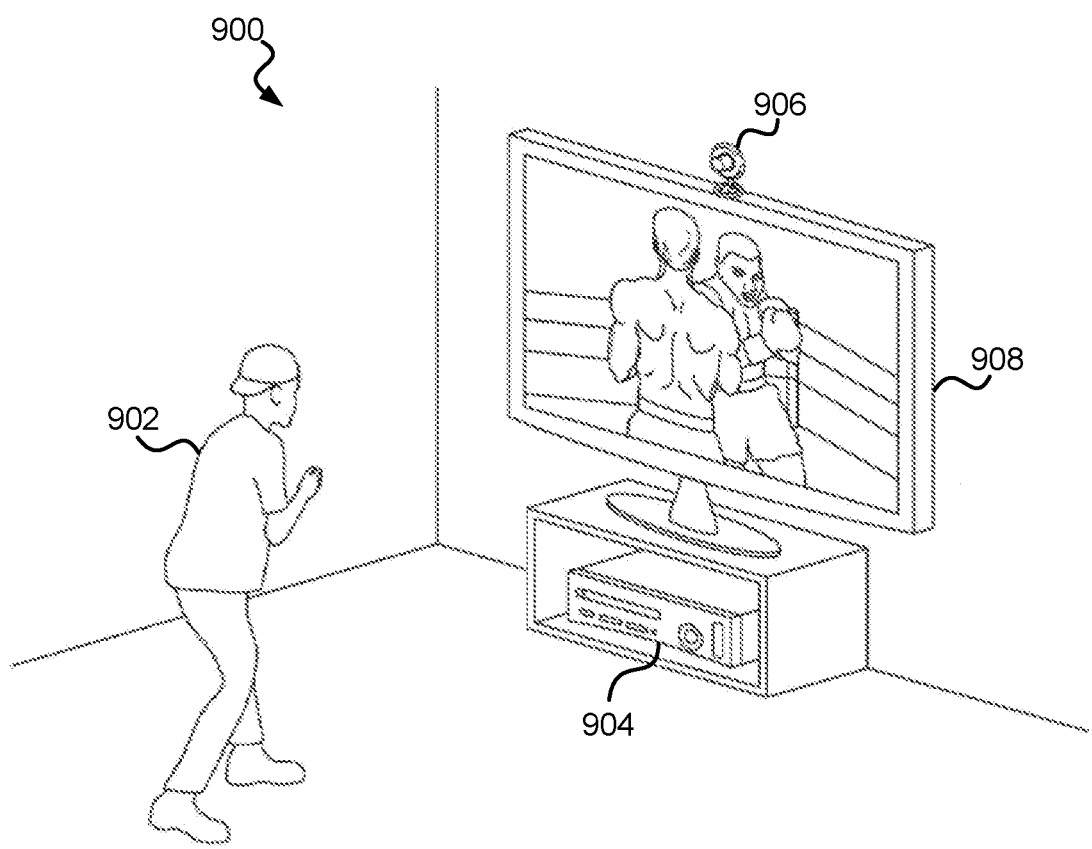
FIG. 9 is a schematic diagram of a camera-based control system for controlling a computer game.

FIG. 9 shows an example camera-based control system 900 for controlling a computer game. FIG. 9 shows a user 902 playing, in this illustrative example, a boxing game. In some examples, camera-based control system 900 may be used to, among other things, determine body pose, bind, recognize, analyze, track, associate to a human target, provide feedback, interpret gestures, and/or adapt to aspects of a human target such as the user 902.

The camera-based control system 900 comprises a computing device 904. The computing device 904 may be a general purpose computer, gaming system or console, or dedicated image processing device. The computing device 904 may include hardware components and/or software components such that the computing device 904 may be used to execute applications such as gaming applications and/or non-gaming applications. The structure of the computing device 904 is discussed hereinafter with reference to FIG. 10.

The camera-based control system 900 further comprises a capture device 906. The capture device 906 may be, for example, an image sensor or detector that may be used to visually monitor one or more users (such user 902) such that gestures performed by the one or more users may be captured, analyzed, processed, and tracked to perform one or more controls or actions within a game or application, as described in more detail below. The capture device 906 may be arranged to capture the observed data 208 of FIG. 2.

The camera-based control system 900 may further comprise a display device 908 connected to the computing device 904. The computing device may be a television, a monitor, a high-definition television (HDTV), or the like that may provide game or application visuals (and optionally audio) to the user 902.

In operation, the user 902 may be tracked using the capture device 906 and the computer device 904 such that the pose and correspondences of user 902 (and any props the user is using) may be interpreted by the computing device 904 (and/or the capture device 906) as controls that may be used to affect the application being executed by computing device 904. As a result, the user 902 may move his or her body to control an executed game or application.

In the illustrative example of FIG. 9, the application executing on the computing device 904 is a boxing game that the user 902 is playing. In this example, the computing device 904 controls the display device 908 to provide a visual representation of a boxing opponent to the user 902. The computing device 904 also controls the display device 908 to provide a visual representation of a user avatar that the user 902 may control with his or her movements. For example, the user 902 may throw a punch in physical space to cause the user avatar to throw a punch in game space. Thus, according to this example, the computing device 904 and the capture device 906 of the camera-based control system 900 may be used to recognize and analyze the punch of the user 902 in physical space such that the punch may be interpreted as a game control of the user avatar in game space.

Furthermore, some movements may be interpreted as controls that correspond to actions other than controlling the avatar. For example, the user may use movements to enter, exit, turn system on or off, pause, save a game, select a level, profile or menu, view high scores, communicate with a friend, etc. Additionally, movement of the user 902 may be used and analyzed in any suitable manner to interact with applications other than games, for example to enter text, select icons or menu items, control media playback, browse websites or operate any other controllable aspect of an operating system or application.

Figure 10:
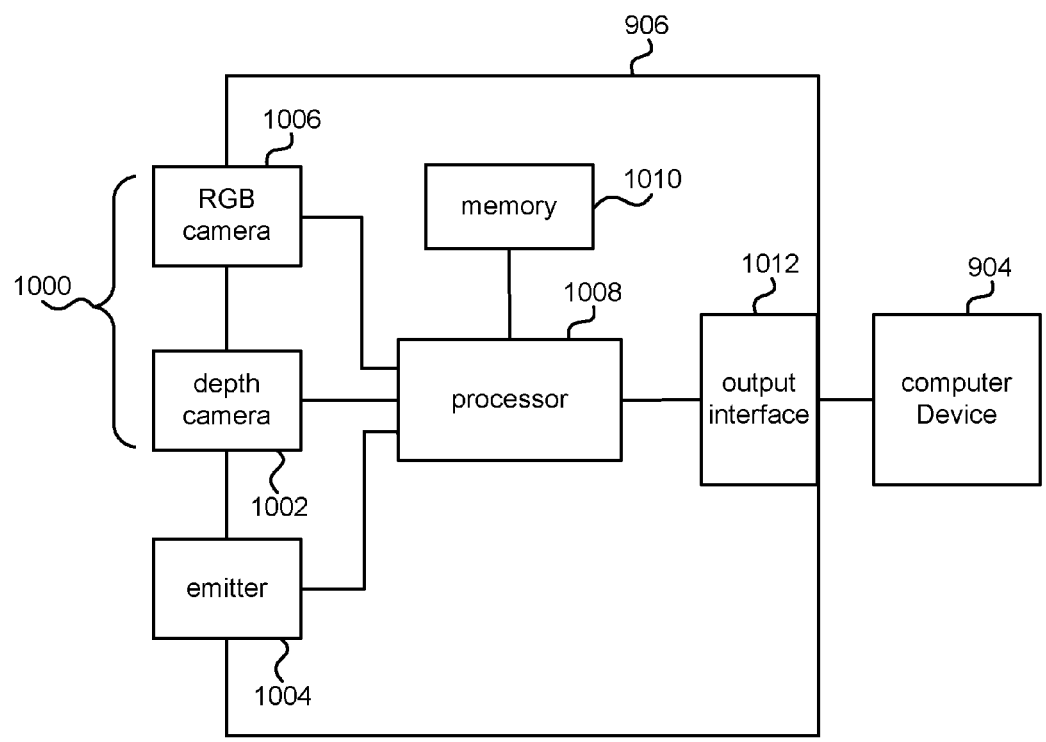
FIG. 10 is a schematic diagram of an image capture device.

Reference is now made to FIG. 10, which illustrates a schematic diagram of the capture device 906 that may be used in the camera-based control system 900 of FIG. 9. In the example of FIG. 10 the capture device 906 is configured to capture video images with depth information. Such a capture device may be referred to as a depth camera. The depth information may be in the form of a depth image that includes depth values, i.e. a value associated with each image element of the depth image that is related to the distance between the depth camera and an item or object located at that image element.

The depth information may be obtained using any suitable technique including, for example, time-of-flight, structured light, stereo image, or the like. In some examples, the capture device 906 may organize the depth information into "Z layers," or layers that may be perpendicular to a Z-axis extending from the depth camera along its line of sight.

As shown in FIG. 10, the capture device 906 comprises at least one imaging sensor 1000. In the example shown in FIG. 10, the imaging sensor 1000 comprises a depth camera 1002 arranged to capture a depth image of a scene. The captured depth image may include a two-dimensional (2-D) area of the captured scene where each image element in the 2-D area represents a depth value such as a length or distance of an object in the captured scene from the depth camera 1002.

The capture device may also include an emitter 1004 arranged to illuminate the scene in such a manner that depth information may be ascertained by the depth camera 1002. For example, in the case that the depth camera 1002 is an infra-red (IR) time-of-flight camera, the emitter 1004 emits IR light onto the scene, and the depth camera 1002 is arranged to detect backscattered light from the surface of one or more targets and objects in the scene. In some examples, pulsed infrared light may be emitted from the emitter 1004 such that the time between an outgoing light pulse and a corresponding incoming light pulse may be detected by the depth camera and measured and used to determine a physical distance from the capture device 1006 to a position on the targets or objects in the scene. Additionally, in some examples, the phase of the outgoing light wave from the emitter 1004 may be compared to the phase of the incoming light wave at the depth camera 1002 to determine a phase shift. The phase shift may then be used to determine a physical distance from the capture device 1006 to a position on the targets or objects. In a further example, time-of-flight analysis may be used to indirectly determine a physical distance from the capture device 1006 to a position on the targets or objects by analyzing the intensity of the reflected beam of light over time via various techniques including, for example, shuttered light pulse imaging.

In another example, the capture device 1006 may use structured light to capture depth information. In such a technique, patterned light (e.g., light displayed as a known pattern such as grid pattern or a stripe pattern) may be projected onto the scene using the emitter 1004. Upon striking the surface of one or more targets or objects in the scene, the pattern becomes deformed. Such a deformation of the pattern may be captured by the depth camera 1002 and then be analyzed to determine a physical distance from the capture device 1006 to a position on the targets or objects in the scene.

In another example, the depth camera 1002 may be in the form of two or more physically separated cameras that view a scene from different angles, such that visual stereo data is obtained that may be resolved to generate depth information. In this case the emitter 1004 may be used to illuminate the scene or may be omitted.

In some examples, in addition to the depth camera 1002, the capture device 1006 may comprise a regular video camera, which is referred to as an RGB camera. The RGB camera is arranged to capture sequences of images of the scene at visible light frequencies, and may hence provide images that may be used to augment the depth images. In alternative examples, the RGB camera may be used instead of the depth camera 1002.

The capture device 1006 shown in FIG. 10 further comprises at least one processor 1008, which is in communication with the imaging sensor 1000 (i.e. depth camera 1002 and RGB camera in the example of FIG. 10) and the emitter 1004. The processor 1008 may be a general purpose microprocessor, or a specialized signal/image processor. The processor 1008 is arranged to execute instructions to control the imaging sensor 1000 and emitter 1004 to capture depth images and/or RGB images. The processor 1008 may also optionally be arranged to perform processing on these images, as outlined in more detail hereinafter.

In some examples the imaging sensor is used to provide silhouette images which are two dimensional binary images identifying foreground and background regions of the depth and/or RGB images captured by the imaging sensor. The silhouette images may be formed at the imaging sensor and/or processor 1008 from the captured depth and RGB images. The silhouette images may be processed using the methods described herein to resolve ambiguities found when RGB images are used in the methods described herein. In this case the silhouette images may be thought of as depth images flattened to a fixed depth.

The capture device 1006 shown in FIG. 10 further includes a memory 1010 arranged to store the instructions that for execution by the processor 1008, images or frames of images captured by the depth camera 1002 or RGB camera, or any other suitable information, images, or the like. In some examples, the memory 1010 may include random access memory (RAM), read only memory (ROM), cache, Flash memory, a hard disk, or any other suitable storage component. The memory 1010 may be a separate component in communication with the processor 1008 or integrated into the processor 1008.

The capture device 1006 also comprises an output interface 1012 in communication with the processor 1008 and is arranged to provide data to the computing device 904 via a communication link. The communication link may be, for example, a wired connection (such as USB (trademark), Firewire (trademark), Ethernet (trademark) or similar) and/or a wireless connection (such as WiFi (trademark), Bluetooth (trademark) or similar). In other examples, the output interface 1012 may interface with one or more communication networks (such as the internet) and provide data to the computing device 904 via these networks. The computing device 904 may comprise a regression engine 200 and a model fitting engine 202 as described above with reference to FIG. 2.

Figure 11:
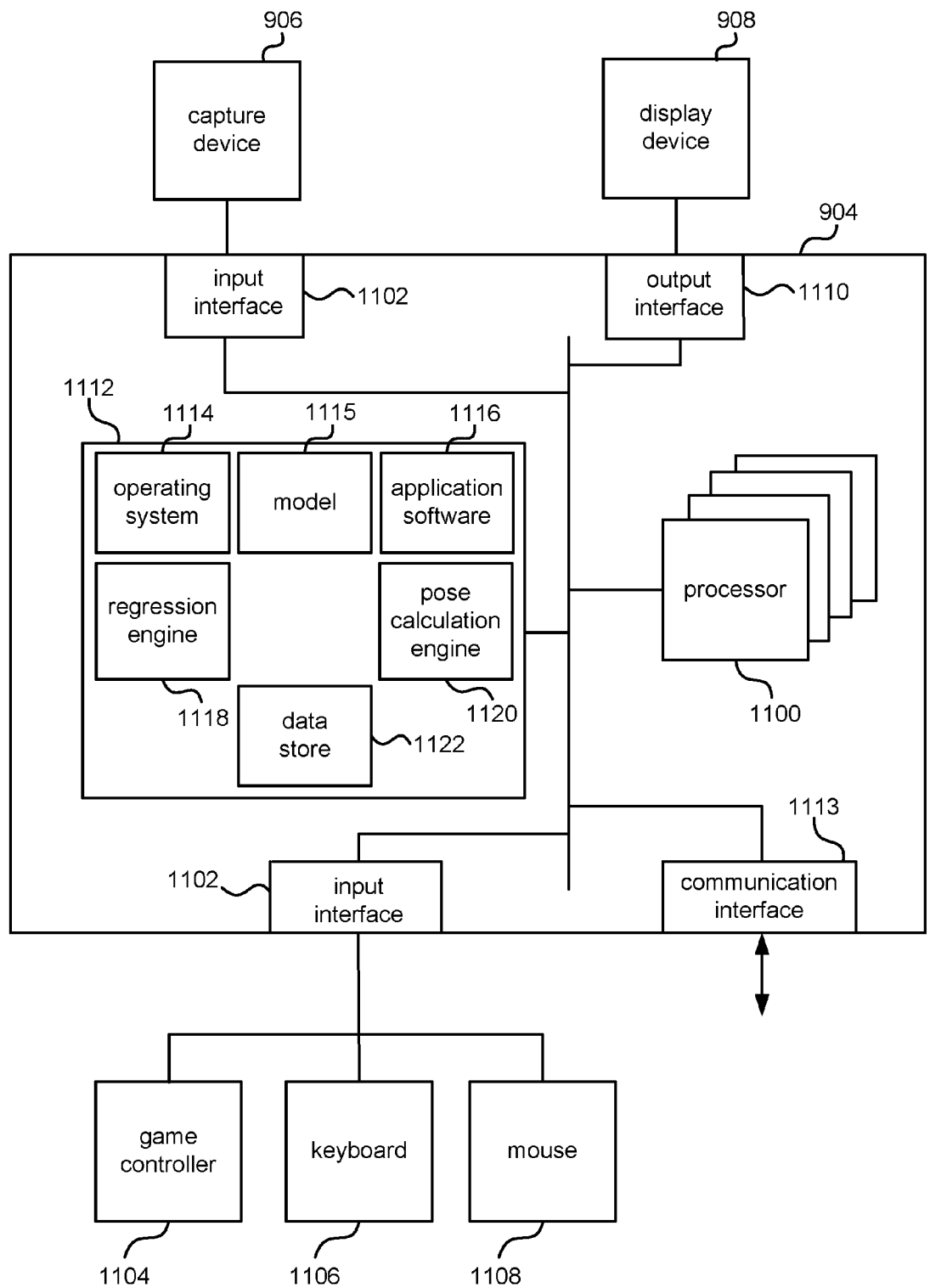
FIG. 11 illustrates an exemplary computing-based device in which embodiments of a system for calculating pose and/or shape and fitting a model to observed data of a modifiable entity may be implemented.

FIG. 11 illustrates various components of an exemplary computing-based device 904 which may be implemented as any form of a computing and/or electronic device, and in which embodiments of systems for calculating pose of articulated entities from observed data such as one or more images may be implemented.

Computing-based device 904 comprises one or more processors 1100 which may be microprocessors, controllers, graphics processing units, parallel processing units, or any other suitable type of processors for processing computing executable instructions to control the operation of the device in order to calculate pose of an articulated entity from observed data such as one or more images. In some examples, for example where a system on a chip architecture is used, the processors 1100 may include one or more fixed function blocks (also referred to as accelerators) which implement a part of the method of model fitting and pose calculation in hardware (rather than software or firmware).

The computing-based device 904 comprises one or more input interfaces 1102 arranged to receive and process input from one or more devices, such as user input devices (e.g. capture device 906, a game controller 1104, a keyboard 1106 and/or a mouse 1108). This user input may be used to control software applications or games executed on the computing device 904.

The computing-based device 904 also comprises an output interface 1110 arranged to output display information to a display device 908 which can be separate from or integral to the computing device 904. The display information may provide a graphical user interface. In an example, the display device 908 may also act as the user input device if it is a touch sensitive display device. The output interface may also output data to devices other than the display device, e.g. a locally connected printing device.

The computer executable instructions may be provided using any computer-readable media that is accessible by computing based device 904. Computer-readable media may include, for example, computer storage media 1112 such as memory and communications media. Computer storage media 1112, such as memory 1112, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media 1112 (memory) is shown within the computing-based device 904 it will be appreciated that the storage may be distributed or located remotely and accessed via a network or other communication link (e.g. using communication interface 1113).

Platform software comprising an operating system 1114 or any other suitable platform software may be provided at the computing device 904 to enable application software 1116 to be executed on the device. Other functionality that can be executed on the computing device 904 includes: regression engine 1118; model fitting engine 1220 (see for example FIG. 6 and description above). A data store 1122 is provided to store data such as observed data, training data, intermediate function results, tree training parameters, probability distributions, classification labels, regression objectives, classification objectives, energy function terms, energy function term weights and other data.

The term 'computer' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of calculating pose or shape of an articulated or deformable entity comprising:

receiving at least one image of the entity;

accessing a model of a class of articulated or deformable entities of which the imaged entity is a member, the model comprising a plurality of parameters specifying the pose or shape of the model;

using the image to access a plurality of candidate correspondences between image elements of the received image and model points which are locations on or in the model;

carrying out an optimization process to find values of the parameters specifying the pose or shape of the model which agrees with the received image; and where the optimization is influenced by at least some of the candidate correspondences; and at least one of accessing the candidate correspondences from a random decision forest arranged to take image elements of the received image and, for a plurality of image elements of the received image, calculate a probability distribution over candidate correspondences using information associated with its leaves, or carrying out the optimization process by optimizing an energy function, the energy function being over agreement between the model and the received image, where the energy function omits model points which are not visible from a view point of an image capture device which captured the received image by taking into account the direction of surface normals of the model.

2. A method as claimed in claim 1 comprising carrying out the optimization process by optimizing an energy function, the energy function being over agreement between the model and the received image, where the energy function comprises a term arranged to favor correspondences between image elements and model points which are similar where similarity is assessed using the candidate correspondences.

3. A method as claimed in claim 1 comprising accessing the candidate correspondences from a random decision forest arranged to take image elements of the received image and, for each image element, calculate a probability distribution over candidate correspondences using information associated with its leaves.

4. A method as claimed in claim 1 comprising carrying out the optimization process by iteratively fixing and optimizing different terms of an energy function; the energy function being over agreement between the model and the received image.

5. A method as claimed in claim 4 comprising iteratively fixing and optimizing the correspondences and the parameters specifying the pose or shape of the model and where initial correspondences are selected from the candidate correspondences.

6. A method as claimed in claim 1 comprising receiving a sequence of images of the entity over time; using the sequence to find at least one temporally static model parameter; and fixing that parameter in the optimization process.

7. A method as claimed in claim 1 comprising carrying out the optimization process by optimizing an energy function over agreement between the model and the received image, where the energy function comprises a term arranged to encourage nearby image points to map to nearby model points.

8. A method as claimed in claim 1 comprising carrying out the optimization process by optimizing an energy function, the energy function being over agreement between the model and the received image, where the energy function comprises a term arranged to omit model points which are not visible from a view point of an image capture device which captured the received image by taking into account the direction of surface normals of the model.

9. A method as claimed in claim 1 comprising receiving a plurality of images of the entity taken from different view points at the same time and using the plurality of images to access the candidate correspondences.

10. A method as claimed in claim 1 comprising carrying out the optimization process by optimizing an energy function, the energy function being over agreement between the model and the received image, where the energy function comprises a term arranged to penalize values of the pose parameters which are known to be unlikely, or where the method comprises receiving a sequence of images of the entity over time, which do not follow a specified motion model.

11. A method as claimed in claim 1 comprising carrying out the optimization by accessing, for each image element of the received image, a plurality of candidate correspondences, and searching for model points only amongst the candidate correspondences.

12. A method as claimed in claim 1 comprising carrying out the optimization by accessing, for each image element of the received image, at least one candidate correspondence and using that candidate correspondence to guide search of the model points.

13. A computer-implemented method of calculating pose or shape of an articulated or deformable entity comprising:
receiving at least one depth image of the entity;
accessing a model of a class of articulated or deformable entities of which the imaged entity is a member, the model comprising a plurality of parameters specifying the pose of the model;
using the image to access, from a random decision forest, a plurality of candidate correspondences between image elements of the received image and model points which are locations on or in the model; the random decision forest being arranged to take image elements of the received image and, for each image element, calculate a distribution over candidate correspondences using information associated with its leaves; and
carrying out an optimization process to find values of the parameters specifying the pose or shape of the model which agrees with the received image and also to find optimal correspondences between the image elements and model points; and where the optimization is influenced by at least some of the candidate correspondences; the optimization process comprising summing over image elements of the depth image a measure based on a distance between an image element and its corresponding model point.

14. A method as claimed in claim 13 wherein the depth image is a silhouette image comprising a binary image identifying foreground and background regions of a depth image where the depth is flattened to a fixed depth.

15. A method as claimed in claim 14 comprising iteratively fixing and optimizing the correspondences and the parameters specifying the pose or shape of the model and where initial correspondences are selected from the candidate correspondences.

16. A method as claimed in claim 13 comprising carrying out the optimization process by iteratively fixing and optimizing different terms of an energy function; the energy function being over agreement between the model and the received image.

17. A method as claimed in claim 13 comprising carrying out the optimization process by optimizing an energy function, the energy function being over agreement between the model and the received image, where the energy function comprises a term arranged to omit model points which are not visible from a view point of an image capture device which captured the received image by taking into account the direction of surface normals of the model.

18. An apparatus for calculating pose or shape of an articulated or deformable entity comprising:
an input arranged to receive at least one image of the entity;
a memory storing a model of a class of articulated or deformable entities of which the imaged entity is a member, the model comprising a plurality of parameters specifying the pose or shape of the model;
a regression engine arranged to calculate a plurality of candidate correspondences between image elements of the received image and model points which are locations on or in the model; and
an optimizer arranged to find values of the parameters specifying the pose or shape of the model which agrees with the received image; the optimizer being influenced by at least some of the candidate correspondences,
wherein
the regression engine comprises a random decision forest arranged to take image elements of the received image and, for a plurality of image elements of the received image, calculate a probability distribution over candidate correspondences using information associated with its leaves, or
the optimizer being further arranged to optimize an energy function, the energy function being over agreement between the model and the received image, where the energy function omits model points which are not visible from a view point of an image capture device which captured the received image based at least partly on the direction of surface normals of the model.

19. An apparatus as claimed in claim 18 the optimizer being arranged to optimize an energy function, the energy function being over agreement between the model and the received image, where the energy function comprises a term arranged to favor correspondences between image elements and model points which are similar where similarity is assessed using the regression engine.

20. An apparatus as claimed in claim 18 wherein the regression engine comprises a random decision forest arranged to take image elements of the received image and, for each image element, calculate a probability distribution over candidate correspondences using information associated with its leaves.

* * * * *